United States Patent
Kaminski, Jr.

(10) Patent No.: US 8,171,004 B1
(45) Date of Patent: *May 1, 2012

(54) USE OF HASH VALUES FOR IDENTIFICATION AND LOCATION OF CONTENT

(75) Inventor: Charles Kaminski, Jr., Omaha, NE (US)

(73) Assignee: Pinehill Technology, LLC, Wilmington, DE (US)

( * ) Notice: Subject to any disclaimer, the term of this patent is extended or adjusted under 35 U.S.C. 154(b) by 173 days.

This patent is subject to a terminal disclaimer.

(21) Appl. No.: 11/732,834

(22) Filed: Apr. 5, 2007

Related U.S. Application Data

(63) Continuation of application No. 11/408,199, filed on Apr. 20, 2006.

(51) Int. Cl.
*G06F 7/00* (2006.01)
*G06F 17/00* (2006.01)

(52) U.S. Cl. .......................... 707/698; 707/741; 711/216

(58) Field of Classification Search ............... 707/10, 707/101, 3, 102, 698, 747, 741; 709/225; 726/23; 711/216
See application file for complete search history.

(56) References Cited

U.S. PATENT DOCUMENTS

| | | | |
|---|---|---|---|
| 4,503,514 A | 3/1985 | Urquhart | |
| 4,903,194 A * | 2/1990 | Houdek et al. ................. | 714/53 |
| 5,528,033 A | 6/1996 | Lo et al. | |
| 5,719,958 A | 2/1998 | Wober et al. | |
| 5,892,536 A | 4/1999 | Logan et al. | |
| 5,918,223 A | 6/1999 | Blum et al. | |
| 5,973,692 A | 10/1999 | Knowlton et al. | |
| 6,021,491 A | 2/2000 | Renaud | |
| 6,052,486 A | 4/2000 | Knowlton et al. | |
| 6,098,054 A | 8/2000 | McCollom et al. | |
| 6,195,497 B1 | 2/2001 | Nagasaka et al. | |
| 6,212,525 B1 * | 4/2001 | Guha ............................ | 707/101 |
| 6,310,966 B1 | 10/2001 | Dulude et al. | |
| 6,526,411 B1 | 2/2003 | Ward | |
| 6,546,397 B1 | 4/2003 | Rempell | |
| 6,594,665 B1 * | 7/2003 | Sowa et al. ..................... | 707/10 |
| 6,671,407 B1 | 12/2003 | Venkatesan et al. | |
| 6,678,680 B1 | 1/2004 | Woo | |
| 6,691,126 B1 | 2/2004 | Syeda-Mahmood | |
| 6,704,730 B2 | 3/2004 | Moulton et al. | |
| 6,748,533 B1 | 6/2004 | Wu et al. | |
| 6,952,730 B1 * | 10/2005 | Najork et al. ................. | 709/225 |
| 6,963,675 B2 | 11/2005 | Watanabe | |
| 6,963,975 B1 | 11/2005 | Weare | |
| 7,031,980 B2 | 4/2006 | Logan et al. | |
| 7,043,473 B1 | 5/2006 | Rassool et al. | |
| 7,043,476 B2 | 5/2006 | Robson | |

(Continued)

OTHER PUBLICATIONS

U.S. Appl. No. 11/408,199, filed Apr. 20, 2007, Charles F. Kaminski, Jr.

(Continued)

*Primary Examiner* — Giovanna Colan
(74) *Attorney, Agent, or Firm* — Olive Law Group, PLLC

(57) ABSTRACT

Surrogate hashing is described, including initializing one or more variables in a collection, evaluating an address associated with a host, comparing the address to the collection to determine if the address is stored in the collection, and processing the address to hash a file identified by the address if the address is not stored in the collection or determining if another address is indicated by the address if the address is stored in the collection.

39 Claims, 8 Drawing Sheets

U.S. PATENT DOCUMENTS

| | | | |
|---|---|---|---|
| 7,046,473 | B2 | 5/2006 | Fu et al. |
| 7,073,197 | B2 | 7/2006 | Rabin et al. |
| 7,080,253 | B2 | 7/2006 | Weare |
| 7,139,747 | B1* | 11/2006 | Najork ............... 707/3 |
| 7,174,293 | B2 | 2/2007 | Kenyon et al. |
| 7,194,752 | B1 | 3/2007 | Kenyon et al. |
| 7,240,207 | B2 | 7/2007 | Weare |
| 7,242,988 | B1 | 7/2007 | Hoffberg et al. |
| 7,302,574 | B2 | 11/2007 | Conwell et al. |
| 7,328,153 | B2 | 2/2008 | Wells et al. |
| 7,346,512 | B2 | 3/2008 | Li-Chun Wang et al. |
| 7,460,994 | B2 | 12/2008 | Herre et al. |
| 7,600,125 | B1 | 10/2009 | Stringham |
| 7,624,264 | B2* | 11/2009 | Aura et al. ............... 713/162 |
| 7,640,354 | B2 | 12/2009 | Bjorner et al. |
| 7,680,788 | B2 | 3/2010 | Woo |
| 7,747,582 | B1 | 6/2010 | Kaminski, Jr. |
| 7,769,794 | B2 | 8/2010 | Moore et al. |
| 7,792,810 | B1 | 9/2010 | Kaminski, Jr. |
| 7,801,868 | B1 | 9/2010 | Kaminski, Jr. |
| 7,809,154 | B2 | 10/2010 | Lienhart et al. |
| 7,814,070 | B1 | 10/2010 | Kaminski, Jr. |
| 7,840,540 | B2 | 11/2010 | Kaminski, Jr. |
| 2001/0017940 | A1 | 8/2001 | Kim et al. |
| 2001/0044719 | A1 | 11/2001 | Casey |
| 2002/0018174 | A1 | 2/2002 | Kim |
| 2002/0083060 | A1 | 6/2002 | Wang et al. |
| 2002/0133499 | A1 | 9/2002 | Ward et al. |
| 2003/0086341 | A1 | 5/2003 | Wells |
| 2003/0191764 | A1 | 10/2003 | Richards |
| 2003/0212494 | A1 | 11/2003 | Alexander et al. |
| 2004/0017244 | A1 | 1/2004 | Sihm et al. |
| 2004/0030691 | A1 | 2/2004 | Woo |
| 2004/0064737 | A1* | 4/2004 | Milliken et al. ............... 713/201 |
| 2004/0172411 | A1 | 9/2004 | Herre et al. |
| 2004/0240562 | A1 | 12/2004 | Bargeron et al. |
| 2004/0249859 | A1 | 12/2004 | Ward et al. |
| 2005/0038819 | A1 | 2/2005 | Hicken et al. |
| 2005/0065976 | A1 | 3/2005 | Holm et al. |
| 2005/0089216 | A1 | 4/2005 | Schiller et al. |
| 2005/0169529 | A1 | 8/2005 | Owechko et al. |
| 2005/0172312 | A1 | 8/2005 | Lienhart et al. |
| 2005/0198507 | A1 | 9/2005 | Brender et al. |
| 2006/0031486 | A1 | 2/2006 | Miner |
| 2006/0039561 | A1 | 2/2006 | Ypya et al. |
| 2006/0095654 | A1* | 5/2006 | Miller et al. ............... 711/108 |
| 2006/0122839 | A1 | 6/2006 | Li-Chun Wang et al. |
| 2006/0156282 | A1 | 7/2006 | Mathew |
| 2006/0187477 | A1 | 8/2006 | Maki et al. |
| 2006/0195909 | A1 | 8/2006 | Boswell et al. |
| 2006/0235875 | A1 | 10/2006 | Wen et al. |
| 2006/0253491 | A1 | 11/2006 | Gokturk et al. |
| 2007/0021195 | A1 | 1/2007 | Campbell et al. |
| 2007/0050761 | A1 | 3/2007 | Hester et al. |
| 2007/0092103 | A1 | 4/2007 | Mihcak et al. |
| 2007/0101147 | A1 | 5/2007 | Brunk et al. |
| 2007/0118375 | A1 | 5/2007 | Kenyon et al. |
| 2007/0129952 | A1 | 6/2007 | Kenyon et al. |
| 2007/0198838 | A1* | 8/2007 | Nonaka et al. ............... 713/176 |
| 2007/0226507 | A1 | 9/2007 | Schilling |
| 2007/0250521 | A1 | 10/2007 | Kaminski, Jr. |
| 2007/0276733 | A1 | 11/2007 | Geshwind et al. |
| 2008/0154401 | A1 | 6/2008 | Wang |
| 2008/0229023 | A1 | 9/2008 | Plamondon |
| 2008/0309819 | A1 | 12/2008 | Hardacker et al. |
| 2008/0317278 | A1 | 12/2008 | Lefebvre et al. |
| 2009/0095654 | A1 | 4/2009 | Gupta et al. |

OTHER PUBLICATIONS

U.S. Appl. No. 11/732,838, filed Apr. 5, 2007, Charles F. Kaminski, Jr.
U.S. Appl. No. 11/784,012, filed Apr. 5, 2007, Charles F. Kaminski, Jr.
U.S. Appl. No. 11/732,833, filed Apr. 5, 2007, Charles F. Kaminski, Jr.
U.S. Appl. No. 11/732,832, filed Apr. 5, 2007, Charles F. Kaminski, Jr.
U.S. Appl. No. 11/732,835, filed Apr. 5, 2007, Charles F. Kaminski, Jr.
U.S. Appl. No. 11/732,842, filed Apr. 5, 2007, Charles F. Kaminski, Jr.
U.S. Appl. No. 11/732,836, filed Apr. 5, 2007, Charles F. Kaminski, Jr.
U.S. Appl. No. 11/824,983, filed Jul. 2, 2007, Charles F. Kaminski, Jr.
U.S. Appl. No. 11/824,973, filed Jul. 2, 2007, Charles F. Kaminski, Jr.
U.S. Appl. No. 11/824,815, filed Jul. 2, 2007, Charles F. Kaminski, Jr.
U.S. Appl. No. 11/824,982, filed Jul. 2, 2007, Charles F. Kaminski, Jr.
U.S. Appl. No. 11/824,996, filed Jul. 2, 2007, Charles F. Kaminski, Jr.
U.S. Appl. No. 11/824,924, filed Jul. 2, 2007, Charles F. Kaminski, Jr.
U.S. Appl. No. 11/824,789, filed Jul. 2, 2007, Charles F. Kaminski, Jr.
U.S. Appl. No. 11/824,995, filed Jul. 2, 2007, Charles F. Kaminski, Jr.
U.S. Appl. No. 11/825,001, filed Jul. 2, 2007, Charles F. Kaminski, Jr.
U.S. Appl. No. 11/824,963, filed Jul. 2, 2007, Charles F. Kaminski, Jr.
U.S. Appl. No. 11/824,957, filed Jul. 2, 2007, Charles F. Kaminski, Jr.
U.S. Appl. No. 11/824,960, filed Jul. 2, 2007, Charles F. Kaminski, Jr.
U.S. Appl. No. 11/824,846, filed Jul. 2, 2007, Charles F. Kaminski, Jr.
Cottingham, John; Notification of Transmittal of the International Search Report and the Written Opinion of the International Searching Authority, or the Declaration; International Application No. PCT/US07/09816; Date of Mailing Jun. 18, 2008; Form PCT/ISA/220 (2 pages); Form PCT/ISA/210 (2 pages); Form PCT/ISA/237 (6 pages).
Reyes, Mariela, D.; U.S. Office Action and Information Disclosure Statement; U.S. Appl. No. 11/408,199; Date of Mailing Jun. 11, 2008; 23 pages.
Reyes, Mariela D., U.S. Patent and Trademark Office Non-Final Office Action, U.S. Appl. No. 11/408,199, Date of Mailing Dec. 17, 2008, 24 pages.
Reyes, Mariela D., U.S. Patent and Trademark Office Non-Final Office Action, U.S. Appl. No. 11/408,199, Date of Mailing Aug. 21, 2009, 27 pages.
Thai, Hanh B., U.S. Patent and Trademark Office Non-Final Office Action, U.S. Appl. No. 11/732,838, Date of Mailing Apr. 2, 2009, 23 pages.
Thai, Hanh B., U.S. Patent and Trademark Office Non-Final Office Action, U.S. Appl. No. 11/732,833, Date of Mailing Apr. 2, 2009, 25 pages.
Reyes, Mariela D., U.S. Patent and Trademark Office Non-Final Office Action, U.S. Appl. No. 11/732,832, Date of Mailing Sep. 21, 2009, 27 pages.
Thai, Hanh B., U.S. Patent and Trademark Office Non-Final Office Action, U.S. Appl. No. 11/784,012, Date of Mailing Mar. 31, 2009, 20 pages.
Colan, Giovanna B., U.S. Patent and Trademark Office Non-Final Office Action, U.S. Appl. No. 11/732,835, Date of Mailing Apr. 15, 2009, 21 pages.
Colan, Giovanna B., U.S. Patent and Trademark Office Non-Final Office Action, U.S. Appl. No. 11/732,842, Date of Mailing May 28, 2009, 19 pages.
Corrielus, Jean M., U.S. Patent and Trademark Office Non-Final Office Action, U.S. Appl. No. 11/732,836, Date of Mailing Apr. 14, 2009, 18 pages.
Brown, Sheree N., U.S. Patent and Trademark Office Non-Final Office Action, U.S. Appl. No. 11/842,924, Date of Mailing Sep. 10, 2009, 16 pages.
Sayers, Craig; Eshghi, Kave, The Case for Generating URIs by Hashing RDF Content, Aug. 22, 2002, HPL-2002-216, HP Laboratories Palo Alto.
Lynch, Nancy; Malkhi, Dahlia; Ratajczak, David, Atomic Data Access in Distributed Hash Tables, 2002, pp. 295-305, LNCS 2429, Springer-Verlag Berlin Heidelberg.
From U.S. Appl. No. 11/408,199: Notice of Allowance mailed Mar. 23, 2010; Notice of Allowance mailed Jun. 17, 2010.
From U.S. Appl. No. 11/732,833: Notice of Allowance mailed Jan. 8, 2010; Notice of Allowance mailed Apr. 30, 2010.
From U.S. Appl. No. 11/732,836: Notice of Allowance mailed Jan. 11, 2010; Notice of Allowance mailed Apr. 26, 2010.
From U.S. Appl. No. 11/732,838: Notice of Allowance mailed Mar. 18, 2010; Notice of Allowance mailed May 13, 2010.
From U.S. Appl. No. 11/784,012: Notice of Allowance mailed Dec. 14, 2009; Notice of Allowance mailed May 5, 2010.

From U.S. Appl. No. 11/732,835: Final Office Action mailed Jan. 7, 2010; Office Action mailed Sep. 24, 2010; Final Office Action mailed Apr. 26, 2011.
From U.S. Appl. No. 11/732,842: Office Action mailed May 28, 2009; Final Office Action mailed Mar. 5, 2010; Office Action mailed Sep. 24, 2010; Final Office Action mailed Mar. 29, 2011.
From U.S. Appl. No. 11/732,834: Office Action mailed Apr. 10, 2009; Final Office Action mailed Jan. 8, 2010; Office Action mailed Sep. 28, 2010; Final Office Action mailed Apr. 26, 2011; Notice of Allowance mailed Sep. 8, 2011.
From U.S. Appl. No. 11/732,832: Final Office Action mailed on Nov. 22, 2010; Office Action mailed on Jul. 7, 2011.
From U.S. Appl. No. 11/824,924: Notice of Allowance Dec. 14, 2009; Notice of Allowance mailed Jun. 10, 2010.
From U.S. Appl. No. 11/824,960: Office Action mailed Nov. 30, 2009; Final Office Action mailed Jul. 22, 2010; Office Action mailed Mar. 23, 2011; Final Office Action mailed Sep. 23, 2011.
From U.S. Appl. No. 11/824,983: Office Action mailed Sep. 15, 2010; Office Action mailed Apr. 26, 2011.
From U.S. Appl. No. 11/824,973: Office Action mailed Oct. 5, 2009; Final Office Action mailed Jun. 22, 2010; Office Action mailed Oct. 5, 2010; Final Office Action mailed Apr. 12, 2011; Office Action mailed Dec. 5, 2011.
From U.S. Appl. No. 11/824,815: Office Action mailed Oct. 20, 2010; Notice of Allowance mailed Mar. 25, 2011.
From U.S. Appl. No. 11/824,982: Office Action mailed Aug. 16, 2010; Notice of Allowance mailed May 11, 2011; Notice of Allowance mailed Sep. 14, 2011.
From U.S. Appl. No. 11/824,996: Office Action mailed Aug. 5, 2010; Final Office Action mailed Apr. 6, 2011.
From U.S. Appl. No. 11/824,789: Office Action mailed Nov. 24, 2009; Final Office Action mailed Aug. 3, 2010; Office Action mailed Mar. 30, 2011.
From U.S. Appl. No. 11/824,995: Office Action mailed Aug. 4, 2010; Final Office Action mailed Apr. 12, 2011.
From U.S. Appl. No. 11/825,001: Office Action mailed Aug. 2, 2010; Final Office Action mailed Mar. 30, 2011.
From U.S. Appl. No. 11/824,963: Office Action mailed Jul. 8, 2010; Final Office Action mailed Apr. 11, 2011.
From U.S. Appl. No. 11/824,957: Office Action mailed Apr. 27, 2011.
From U.S. Appl. No. 11/824,846: Office Action mailed Nov. 30, 2009; Final Office Action mailed Sep. 2, 2010; Office Action mailed Apr. 12, 2011.
From U.S. Appl. No. 11/824,982: Notice of Allowance mailed Dec. 29, 2011.
From U.S. Appl. No. 11/732,832: Notice of Allowance mailed Jan. 18, 2012.
"Gracenote Playlist," Product Overview, Revised Dec. 29, 2005, Copyright 2005, Gracenote, 2 pages.
Joux, Antoine, "Multicollisions in Iterated Hash Functions. Application to Cascaded Constructions," M. Franklin (ED.): CRYPTO 2004, LNCS 3152, pp. 306-316, 2004, copyright 2004, International Association for Cryptologic Research.
"Relatable's Open Source Audio Signature Solution, TRM," found at <http://www.relatable.com/tech/trm.html>, on the Internet Archive, Copyright 2000, Relatable, printed Nov. 28, 2007, 2 pages.
"TRM: The Universal Barcode for Music and Media from Relatable," found at <htp://relatable.com/tech/trm.html>, copyright 2000-2003, Relatable, printed Oct. 3, 2011, 1 page.

* cited by examiner

USE OF HASH VALUES FOR IDENTIFICATION AND LOCATION OF CONTENT

CROSS REFERENCE TO RELATED APPLICATIONS

This application is a continuation of U.S. patent application Ser. No. 11/408,199, filed Apr. 20, 2006 and entitled "Surrogate Hashing," which is herein incorporated by reference for all purposes.

FIELD OF THE INVENTION

The present invention relates generally to software architecture. More specifically, surrogate hashing is described.

BACKGROUND OF THE INVENTION

The Internet, World Wide Web, and other types of data networks may be used to find information. Specific information is typically sought using these sources by conducting a search. Searches are conducted for various reasons such as research, education, personal, interest, rights management, and others. However, while a large amount of information is available from various sources and services on these networks, the approach used by search service providers and the amount of data (either raw or returned in searches) renders conventional search techniques problematic with regard to accuracy, efficiency, and latency.

Conventional search techniques are problematic because information is identified and found by analyzing text associated with a file. "File" may refer to a physical or logical grouping of data and as such, the file may or may not exist physically. Files may also refer to directory structures or data. A file can have text associated with it such as a reference on a web page (e.g., link, in-line image, and the like), metadata attached to the file, or another resource with text in proximity to or associated with the file reference. If a search is performed using keywords that correspond to the associated text of the file, then the file or file location is delivered as a search result.

This conventional approach is used when searching for files (such as an image file) on the Internet. The service provider's search engine has no knowledge of the contents of the file searched for. Instead, numerous results are returned based on text associated with the file intending to return files that accurately match a search request. However, the file is neither analyzed nor checked to ensure that it matches a user's desired search.

For example, if an intellectual property rights management organization (e.g., law firm, agency) is determining whether a particular image of a popular singer such as Madonna has been copied illegally, the organization may use a conventional search engine to search a network such as the Internet for the image in question. Conventional techniques typically associate the word "Madonna" with an image file. If text is found, automatic search solutions then attempt to analyze the text to determine whether the text indicates the image is similar to the image being sought. The analysis of text associated with a file (image or otherwise) is neither accurate nor efficient. With each search result returned, a user must download the file in its entirety and manually evaluate the file. In the example cited, this approach forces the user to wade through thousands of pictures of other Madonnas such as the biblical Mary. When images of the pop singer Madonna are found, the image files often require additional manual review to determine which image files match a protected image of the popular singer. If a match is determined, then the image is identified as a copy and rights may be enforced. However, there may be additional copies of the protected image online, but if the indicated text is not found associated with the file, then a match can not be determined and rights may not be enforced.

In yet another example, a company may be trying to determine if its computer program is being distributed illegally on a network. Leveraging conventional solutions, the company would search based on text possibly associated with the computer program (e.g., "Get ABC's computer program here for free"). Once again, the files returned in the search are neither analyzed nor checked by the search engine to ensure that they match a user's desired search. There may be copies of the computer program that are never returned in the search results because the copies are not associated with text or because the associated text does not match the search request. For returned search results, manual review of a large amount of data is again required to determine if the files found in a search match those of the proprietary computer application.

Further, conventional solutions that identify files based on content are inefficient for all but comparatively small file sizes (e.g., HTML text, extremely small programs, pictures, or data files) because downloading larger files (e.g., picture files, music files, movie files, executables, and others) requires prohibitive amounts of bandwidth, data storage space, and processing power, which can be expensive and difficult to scale for implementation. Even if the required resources were obtained, the systems on the other side of the network providing the data would quickly become overloaded and may also exceed their allotted data transfer limits. Conventional solutions are also inefficient because analysis of the complete file is required, thus requiring large data storage facilities (e.g., data warehouses, arrays, and the like) and prohibitive amounts of processing power.

Conventional hashing algorithms or "hashing" techniques use an algorithm to generate a unique hash value for a file. However, this technique is problematic, as discussed above and because conventional solutions must first process an entire file to assign a hash value for the file. Subsequently, each file in the search results must have also been processed completely in order to generate a comparable hash value. If the hash value is the same, the files are determined to match. However, using conventional techniques, the same hash value could be calculated for two different files (i.e., collisions may occur), leading to error-prone results. Other conventional hashing solutions require pre-processing of the entire data file, which requires large amounts of storage, processor capability, and bandwidth availability to perform the pre-processing, which is unduly burdensome, slow, and expensive. Conventional solutions are inefficient, inaccurate, labor and time-intensive, and expensive.

Thus, what is needed is for searching for data without the limitations of conventional techniques.

BRIEF DESCRIPTION OF THE DRAWINGS

Various embodiments of the invention are disclosed in the following detailed description and the accompanying drawings.

DETAILED DESCRIPTION

Figure 1:
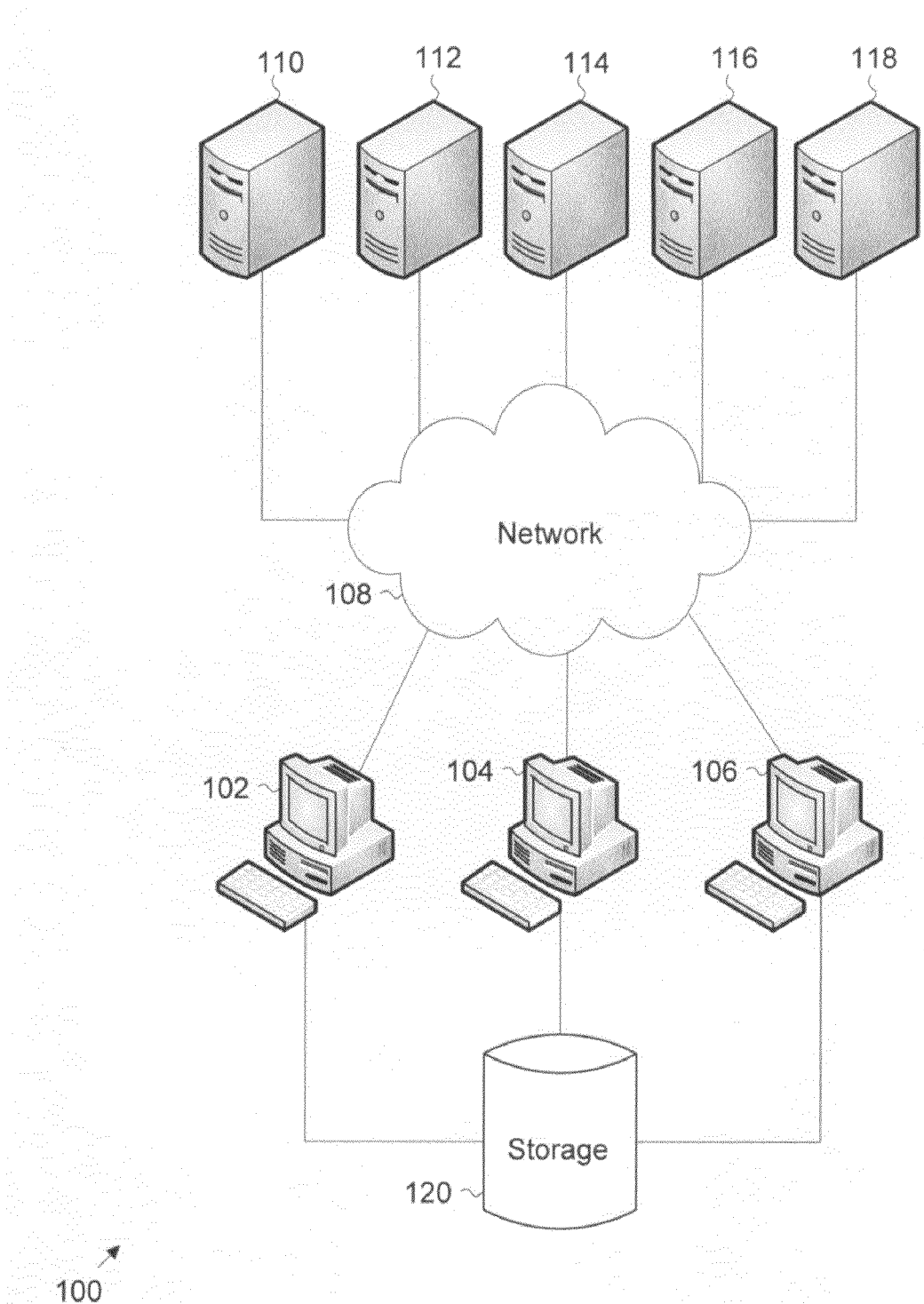
FIG. 1 illustrates an exemplary system for surrogate hashing, in accordance with an embodiment.

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents that are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

Surrogate hashing may be performed by evaluating a sampling or portion ("portion") of a file's data contents. In some embodiments, surrogate hashing may refer to the selection of a standardized portion of a file to determine whether, based on hash values, a selected file is similar to another file. Standardization may be performed systematically and repeatedly to ensure the same portion is taken the next time an identical file is encountered so that hashes are comparable. A portion may be selected from one or multiple parts of a file, including the beginning, middle, or end of a file, or a combination thereof. The data chosen to comprise a portion may be sequential or non-sequential. In some examples, other data outside of the file (e.g., application date, file metadata, and others) may be included in the portion. The data comprising the portion may also be modified before it is hashed. If a file is small (e.g.; approximately 5 kilobytes or a comparably-sized file that has a substantially insignificant impact on supporting computing systems), a portion may also include the whole file. In some examples, surrogate hashing may refer to hashing a portion of a file to determine if another file has the same hash value or set of values. One or more hash values may be generated from a portion to determine whether a given file matches another file. A file may be a group of data for various types of computing systems, including binary, tertiary, quantum, textual, hexadecimal, octal, and others. The group of data may represent an image, photo, graphic, video, audio, computer program or application ("application"), text, or some other data structure. A file may refer to a physical or logical grouping of data and as such, the file may or may not exist physically. In some examples, a portion of a file may be analyzed to generate multiple (e.g., two (2) or more) hash values to identify a given file without the risk of collision. And in still other examples, multiple hash values may be concatenated together. More than one hash may be used to minimize the risk of collisions (i.e., a different file having the same hash value) and to avoid mistakenly identifying a file. By analyzing a portion of a file instead of text or other information associated with a file, file identification may be performed quickly and accurately. Functions such as image searching, rights management, and others, may be performed without delay or omission errors (i.e., failing to return a match when a match should be indicated), and with few or no matching errors (i.e., mistakenly matching two different images). Surrogate hashing may be performed in various environments and is not limited to the use of Hosts, Uniform Resource Locators ("URLs"), crawlers, or the other exemplary environments described herein.

FIG. 1 illustrates an exemplary system for surrogate hashing, in accordance with an embodiment. Here, system 100 includes crawlers 102-106, network 108, content servers 110-118, and storage system 120. The number, type, configuration, and implementation of system 100 and the elements shown may be varied and are not limited to the examples given. In some examples, system 100 may be used to implement the described file identification techniques but may be varied in design, implementation, configuration, and other aspects and features. Crawlers 102-106 may be implemented on computers and processors, including networked computing devices, notebook computers (i.e., laptops), mobile computing devices such as personal digital assistants, smart phones, or other wired or wireless computing devices. Content servers 110-118 may be implemented as application, web, or other types of servers that, when connected to a network, provide information at various locations and addresses (e.g., uniform resource locators (URLs)) accessible from network 108. Crawlers 102-106 may be configured to process domains or hosts ("hosts"), web pages, or other data files (collectively referred to as "files") located on content servers 110-118, which is described in greater detail below in connection with FIGS. 4A-4D. URLs may be addresses or indicators of a file location regardless of system, network, or application protocol. Links may be references to URLs and are not limited to the example used.

In some examples, crawlers 102-106 may be computer programs or applications ("applications") that are designed to search for content by processing files located at a given address and, in some examples, traversing links to other files at the given address according to various types of data processing techniques and structures (e.g., processing pages and links using a tree-structure, and others). Network 108 may be implemented as the Internet, a LAN, WAN, MAN, WLAN, or other type of data network over which data may be exchanged, transferred, downloaded, sent, received, and the like. The techniques described herein are not limited to the type of data network from which files are retrieved or the protocols used to support those networks and may be varied without limitation to the example shown. Storage 120 may be implemented using one or more physical or logical data stores, databases, storage arrays (e.g., SAN), redundant arrays of independent disks (e.g., RAID), data warehouses, clustered storage systems, storage systems using volatile and/or non-volatile storage, storage networks, or other type of data storage formats or facilities and may be varied without limitation to the example shown. In some examples, a database management system may be used. In still other examples, relational database structures and languages may be implemented to enable files, portions of files, hashes, hash values, and other data relating to file searching, indexing, and management to be stored on storage 120. Further, techniques described herein may be implemented as software, hardware, circuitry, or a combination thereof. In some examples, software may be implemented using various programming, scripting, formatting, or other computer programming languages, including C, C++, Java, machine code, assembly, Fortran, XML, HTML, and others. The techniques described herein are not limited to any particular language or format and may be varied accordingly.

Figure 2:
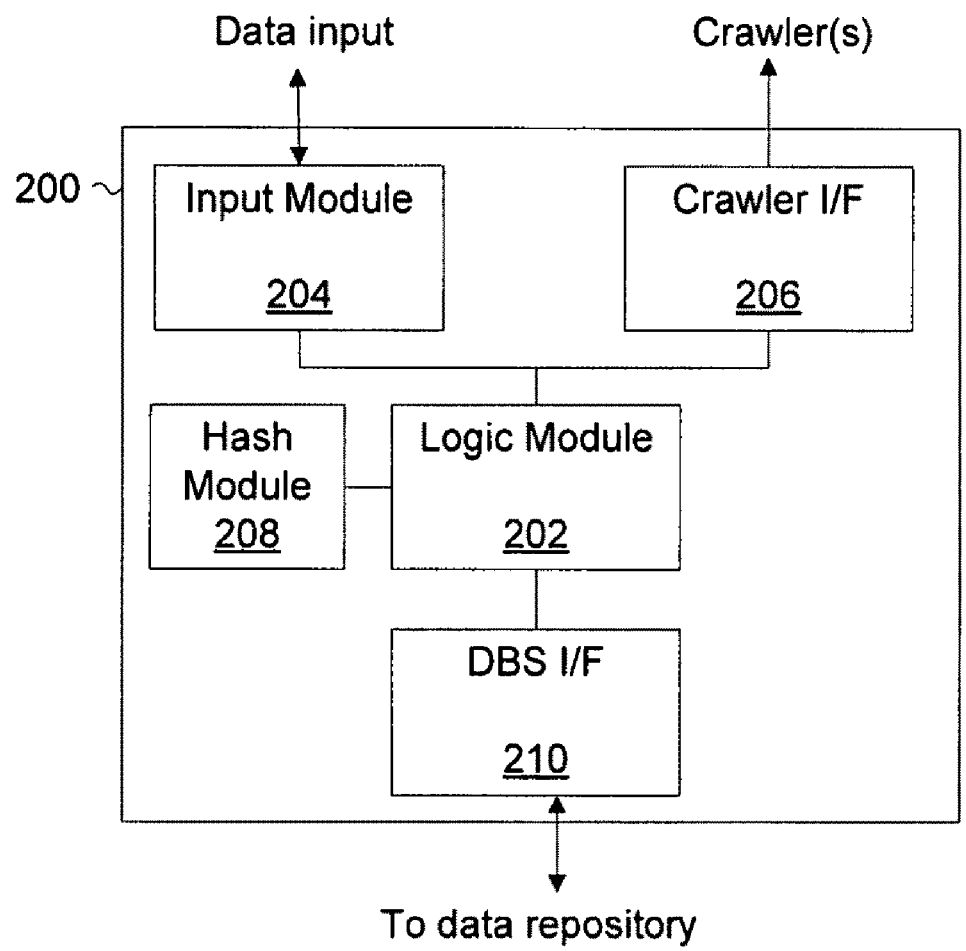
FIG. 2 illustrates an exemplary application architecture for surrogate hashing, in accordance with an embodiment.

FIG. 2 illustrates an exemplary application architecture for surrogate hashing, in accordance with an embodiment. Here, application 200 may include logic module 202, input module 204, crawler interface (I/F) 206, hash module 208, and database system I/F 210. In some examples, application 200 may be implemented as software, hardware, circuitry, or a combination thereof. In some examples, software may be implemented using various programming, scripting, formatting, or other computer programming languages, including C, C++, Java, machine code, assembly, Fortran, XML, HTML, and others. Application 200 is not limited to any particular language or format and its design, architecture, implementation, and operation may be varied apart from the given description.

Here, logic module 202 may guide the operation of application 200, receiving user input via input module 204, sending/receiving data over crawler I/F 206 from crawlers 102-106 processing files found on content servers 110-118 (FIG. 1), running hashing algorithms to generate hash values for files identified, and storing/retrieving data from storage 120 (FIG. 1) using database system (DBS) I/F 210. Logic module 202 may also provide some, all or none of the applications, structure, or functionality of crawlers 102-106. As an example, a search may be initiated by providing a copy of the file desired to be found via input module 204. Once received, a portion of the file is hashed (i.e., hash algorithms are run against the data in the portion of the file) to generate one or more hash values. In some examples, more than one hashing algorithm may be run in order to reduce collisions (i.e., different values having the same hash value or set of values). In other examples, multiple hash values are concatenated together to produce a stronger hash value. Once generated, the hash values are compared to those stored in storage 120. If the hash values generated for the file being sought match hash values of a file stored in storage 120, a location for the file associated with the hash values stored in memory is provided. Thus, other copies of a file (i.e., authorized, unauthorized, copyrighted, or otherwise protected or unprotected) may be found.

In some examples, hash values stored in storage 120 are generated from portions of files found by crawlers 102-106. Here, crawlers 102-106 are directed to a location (e.g., website, URL, or other type of file address) and begin processing and traversing directories, links, URLs, and files associated with the given location. In some examples, crawlers 102-106 (via crawler I/F 206) may continuously or non-continuously process and traverse directories, links, URLs, and files at various locations to continue to store hash values associated with files and locations (e.g., addresses, URLs, and the like) on storage 120. Files may be manually or automatically provided using various types of interfaces (e.g., graphical user interface (GUI), a system administration interface, command line interface (CLI), and others).

Here, a copy of the file to be sought is provided to logic module 202 using input module 204. Logic module 202 may be configured to run one or more hashes (i.e., hashing algorithms) to generate one or more hash values associated with the file. In some examples, two, three, or more hashes may be run instead of a single hash in order to minimize collisions (i.e., to avoid generating the same hash value for different files). In other words, to reduce the risk that files with different binary data found at different locations (i.e., on the Internet or another data networks) may have the same hash value, multiple hashing algorithms (i.e., hashes) may be run to generate a hash value that is individually assigned to a given file.

In some examples, if different files on different hosts have the same hash value, a new hash value may be generated using one or more hashing algorithms that individually identify the different files without conflict. Further, by generating individualized hash values associated with a given value, a file may be accurately matched to a copy of the file. For example, storage 120 may have 80 billion hashes and locations (e.g., URLs). If a file is sought, a hash value is generated for the file, which is then used for a search of storage 120 to determine whether the same hash is found. If a match of the hash value or set of values for the file is found, the location is returned, which identifies the location of the file associated with the hash values stored in storage 120.

Figure 3:
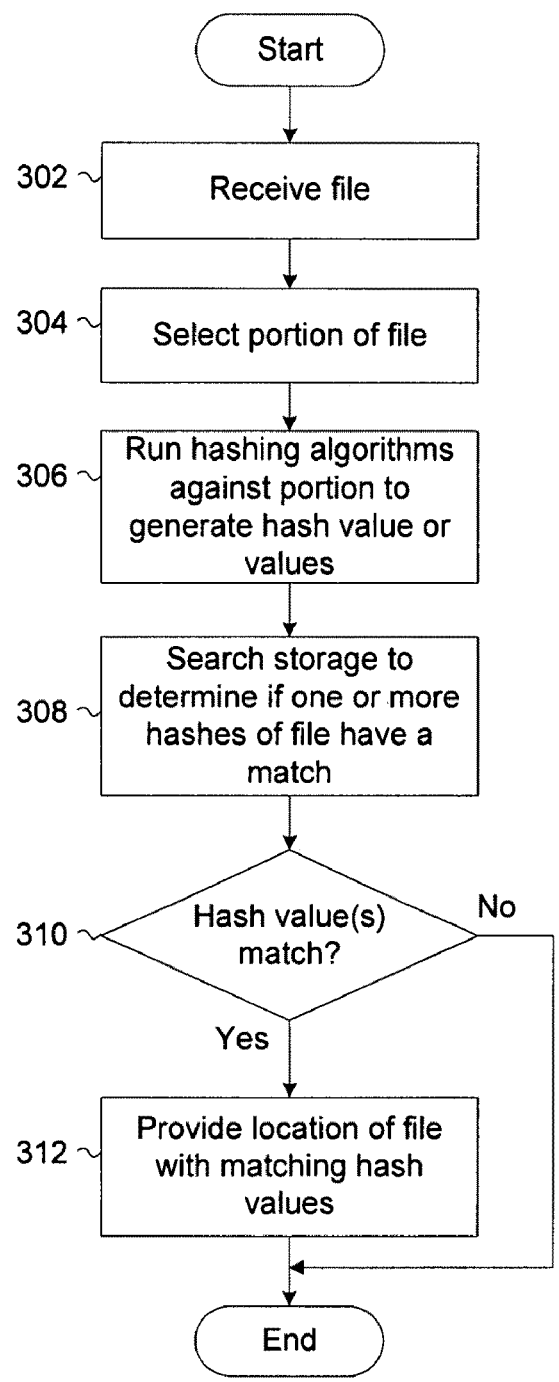
FIG. 3 illustrates an exemplary overall process for surrogate hashing, in accordance with an embodiment.

FIG. 3 illustrates an exemplary process for surrogate hashing, in accordance with an embodiment. File identification may be performed using the below-described process, which may also be varied and is not limited to the description provided. Here, a file is received for a search (302). In some examples, a file may be submitted using a user interface (UI), command line interface, or other application for providing the file to application 200 (FIG. 2). Once a file is provided, a portion of the file is selected for analysis (304). In some examples, portions are "standardized," which refers to identifying a consistent set, part, or sub-set of data that is selected from a file. Standardized portions may be identical in size and location (e.g., 128 bits of data selected from the first (i.e., "front end") 128 bits of a file) or may be identical to other files. The use of standardized portions ensures that substantially similar portions or segments of data are selected for evaluation to help enhance finding a match. In other examples, "standardized" may be different and is not limited to the example given above.

Here, after a standardized portion of data has been selected, one or more hashing algorithms are run against the standardized portion to generate one or more hash values (306). If one hashing algorithm is run, a single hash value may be produced. However, if multiple hashing algorithms are run, then multiple hash values are produced, which may be used individually or in combination to identify a given file. In some examples, multiple hashing algorithms are run to minimize collisions. Here, minimizing collisions refers to the process of generating one or more hash values to individually identify a file without the risk of another, different file having the same set of hash values. After generating the one or more hash values, stored hash values are searched to determine whether a match exists (308). An example of developing hash values for storage and use in searches is described below in connection with FIGS. 4A-4F. In other examples, different techniques for finding, generating, and storing hash values may be implemented apart from those described in connection with FIGS. 4A-4F.

Referring back to FIG. 3, a search is performed to determine if the same hash value or set of hash values exist (310). If the same hash value or set of hash values are not found in storage 120, then the process ends. If the same hash value or set of hash values are found in storage 120, then the location for the file associated with the hash value or set of hash values is returned (312). In other examples, the above-described process may be varied and is not limited to the description given.

Figure 4A:
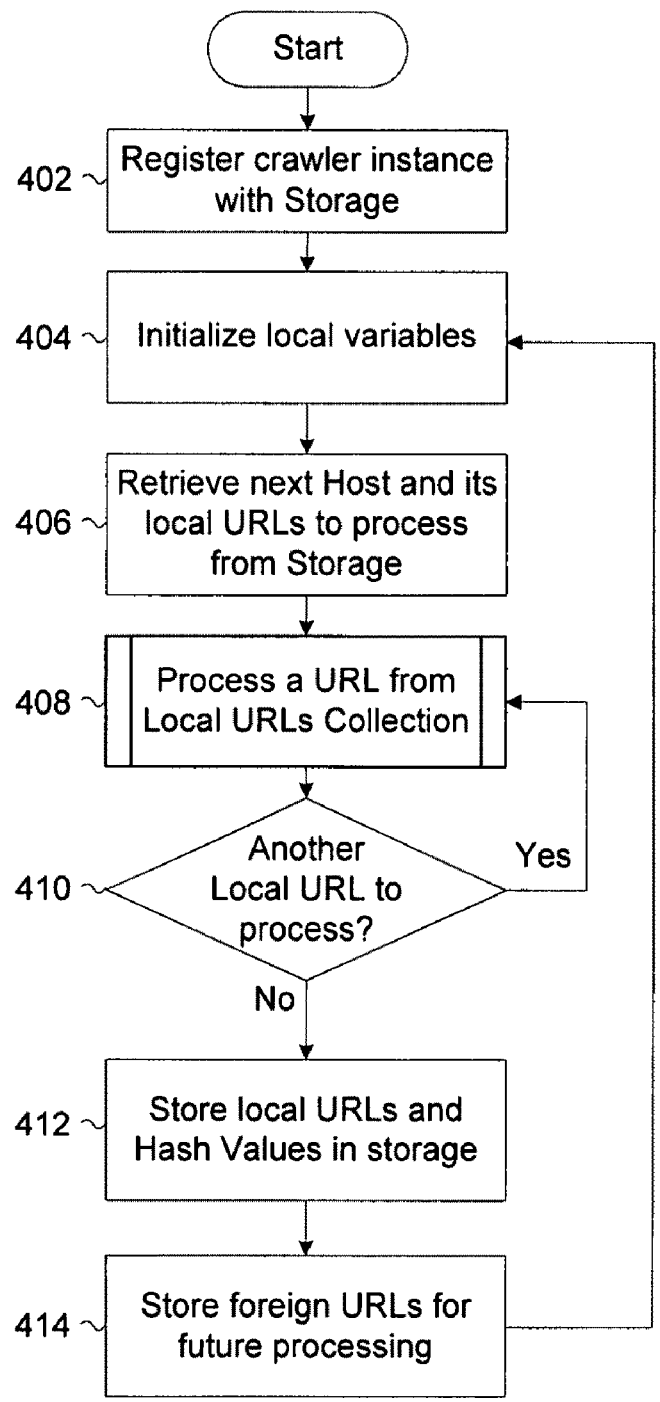
FIG. 4A illustrates an exemplary overall process for surrogate hashing, in accordance with an embodiment.

FIG. 4A illustrates an exemplary overall process for surrogate hashing, in accordance with an embodiment. Here, a crawler instance (i.e., an instantiation of a web crawler, bot, or substantially similar application) is registered with a storage facility, database, data warehouse, or the like (402). Local variables are initialized, including hosts, Local URLs (i.e., URLs that link to other internal files of a host), and Foreign URLs (i.e., URLs that link to files on other hosts) collections (404). In some embodiments, initialization of local variables may include other variables and collections used to decide if a URL should be processed currently or stored (i.e., in storage 120) for later processing instead of processing Local URLs or Foreign URLs. In still other embodiments, initialization of local variables may include variables and collections which support URLs being processed currently or URLs being stored for later processing. Initialization may be performed to make collections of local variables (e.g., Local URLs, Foreign URLs, hosts) available to determine whether a URL is included in a collection. In other embodiments, initialization of local variables may be performed differently. After local variables are initialized, a host is retrieved, including associated local URLs (e.g., links that lead to other pages associated with the location, URL, or website), for processing (406). The retrieved URL is then processed (408). Processing a URL against a Local URLs collection is described in greater detail below in connection with FIG. 4B.

Referring back to FIG. 4A, once a URL has been processed, a determination is made as to whether another URL exists to be processed (410). If another URL is available for processing, then it is processed from the Local URLs collection (408). However, if no further URLs are detected for processing, then the local URLs are stored (in storage 120 (FIG. 1)) along with the hashed values associated with each local URL (412). Foreign URLs are also stored for future processing in storage 120 (414). The process then repeats with initializing local variables prior to retrieving another Host to process (404). In some embodiments, the above-described process may be performed repeatedly on some, none, or all URLs found by registered crawlers as directed. In other embodiments, the above-described process may be varied in design, implementation, execution, and is not limited to the example provided.

Figure 4B:
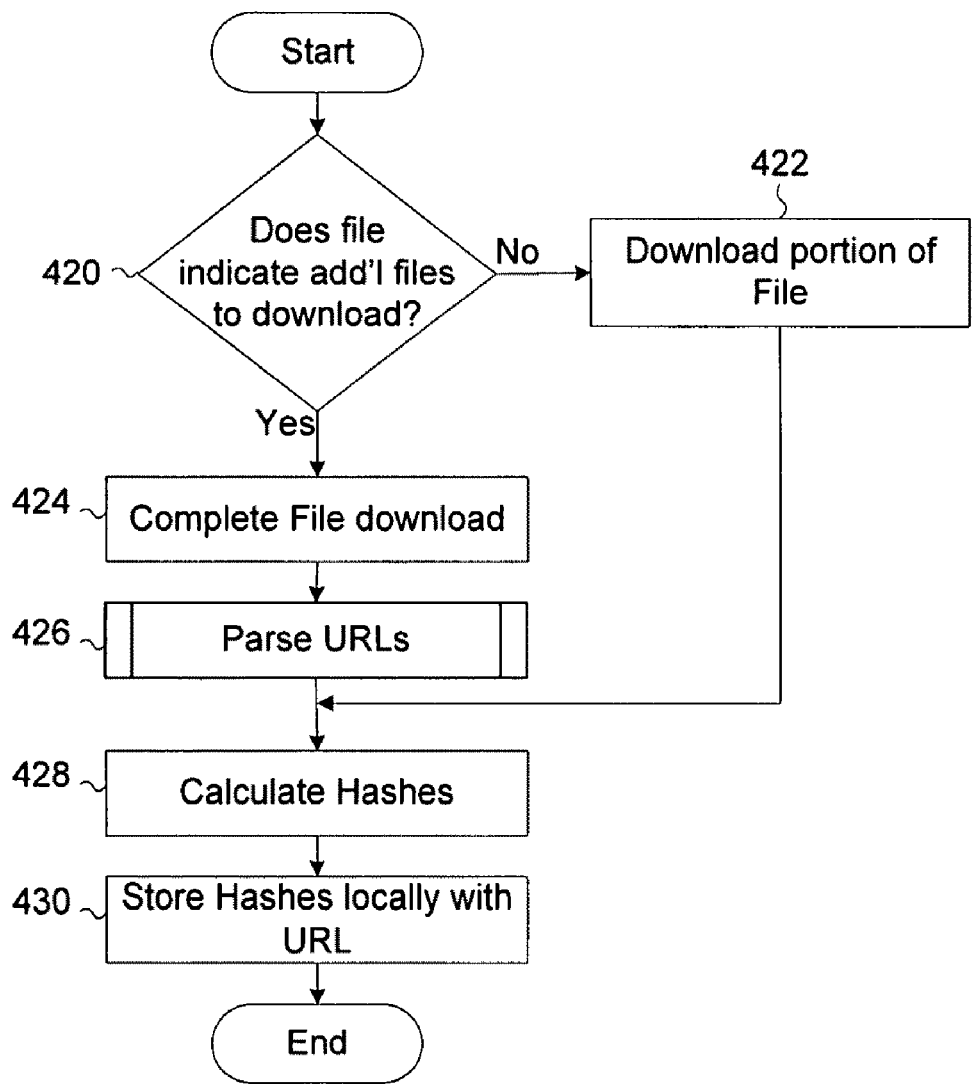
FIG. 4B illustrates exemplary processing of a URL from a Local URL collection, in accordance with an embodiment.

FIG. 4B illustrates exemplary processing of a URL from a Local URL collection, in accordance with an embodiment. Here, a file found at a given URL may be retrieved and hashed. In some examples, a determination is made as to whether a file indicates there are additional files that need to be downloaded (420). If no further files are available for download, then a determination is made to download a standardized (i.e., as described above) portion of a file to be hashed (422). However, if a file contains data indicating other additional files for download (i.e., html, directory listing, or other), then the remainder of the file is downloaded (424). URLs are parsed to capture additional file location data indicated in 420, as described in greater detail below in connection with FIG. 4C (FIG. 426).

Referring back to FIG. 4B, after parsing URLs from a file to identify additional file locations (426) or after downloading a standardized portion of a file (422), the file is hashed to calculate hash values (428). The calculated hash values are then stored locally with the given URL for later storage in storage 120 (430). In other examples, the above-described process may be varied and is not limited to the description provided above.

Figure 4C:
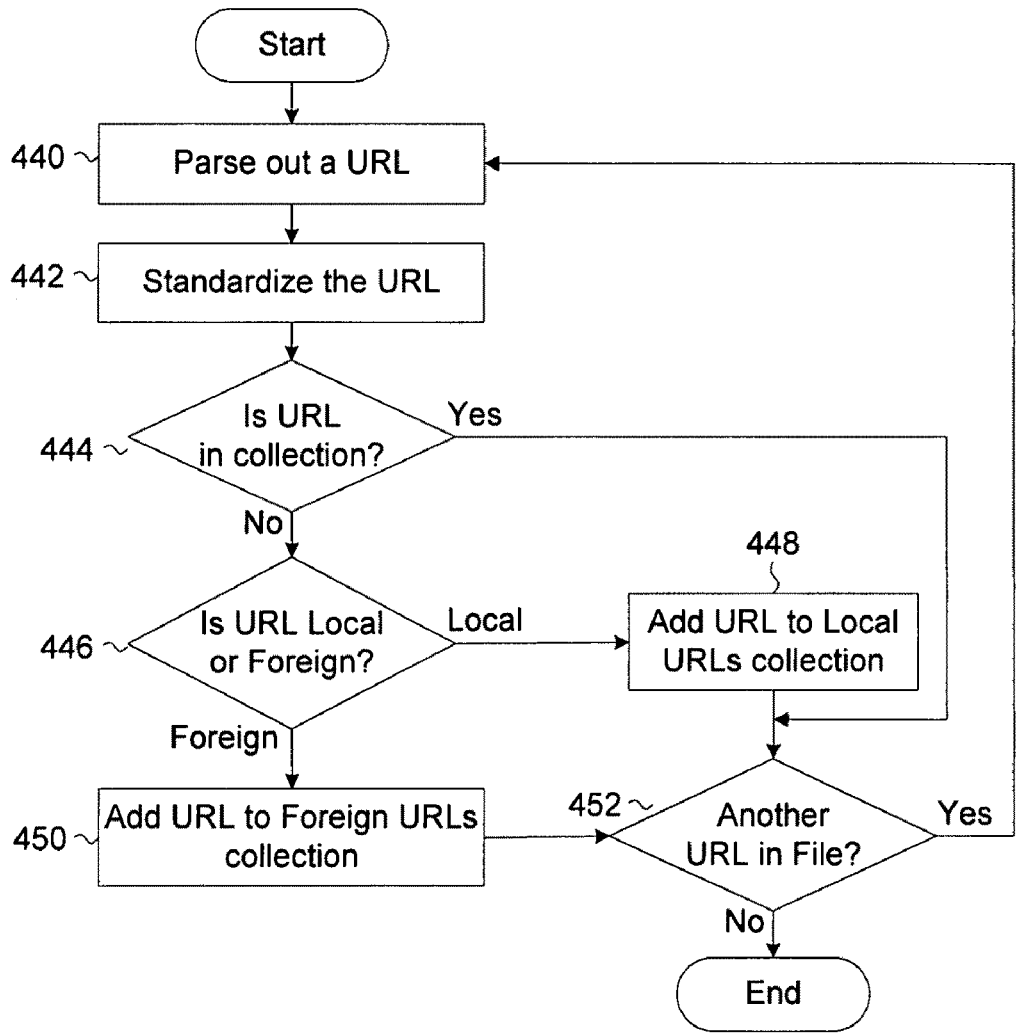
FIG. 4C illustrates an exemplary process for parsing a URL, in accordance with an embodiment.

FIG. 4C illustrates an exemplary process for parsing a URL, in accordance with an embodiment. A more detailed process is provided for describing parsing URLs as mentioned above in connection with FIG. 4B. Here, a URL is parsed out to break up an address into constituent parts in order to standardize the URL into a standard address form that can be checked against a collection (440). Once parsed, the URL is standardized into a given format for an address that can be checked against a collection (442). A determination is made as to whether the URL is in an existing collection (444). If the URL is not found in an existing collection (e.g., Local URLs, Foreign URLs, and others), then a determination is made as to whether the URL is Local or Foreign (446). If the URL is a local URL (444), then it is added to a Local URLs collection (448). If the URL is a foreign URL, then it is added to a Foreign URLs collection (450). After adding the URL to either a Local or a Foreign URLs collection or if the URL is found in an existing collection (444), then a further determination is made as to whether there is another URL in the file (452). If another URL is found, then the process is repeated. If another URL is not found, then the process ends. In some embodiments, the decision to process a URL currently or at a later time may be based on information other than if the URL is Local or Foreign. In yet other embodiments, URLs may be processed currently or stored for later processing. Other data or collections may be used to support this decision. In other embodiments, the above-described process may be varied and is not limited to the example shown and described.

Figure 4D:
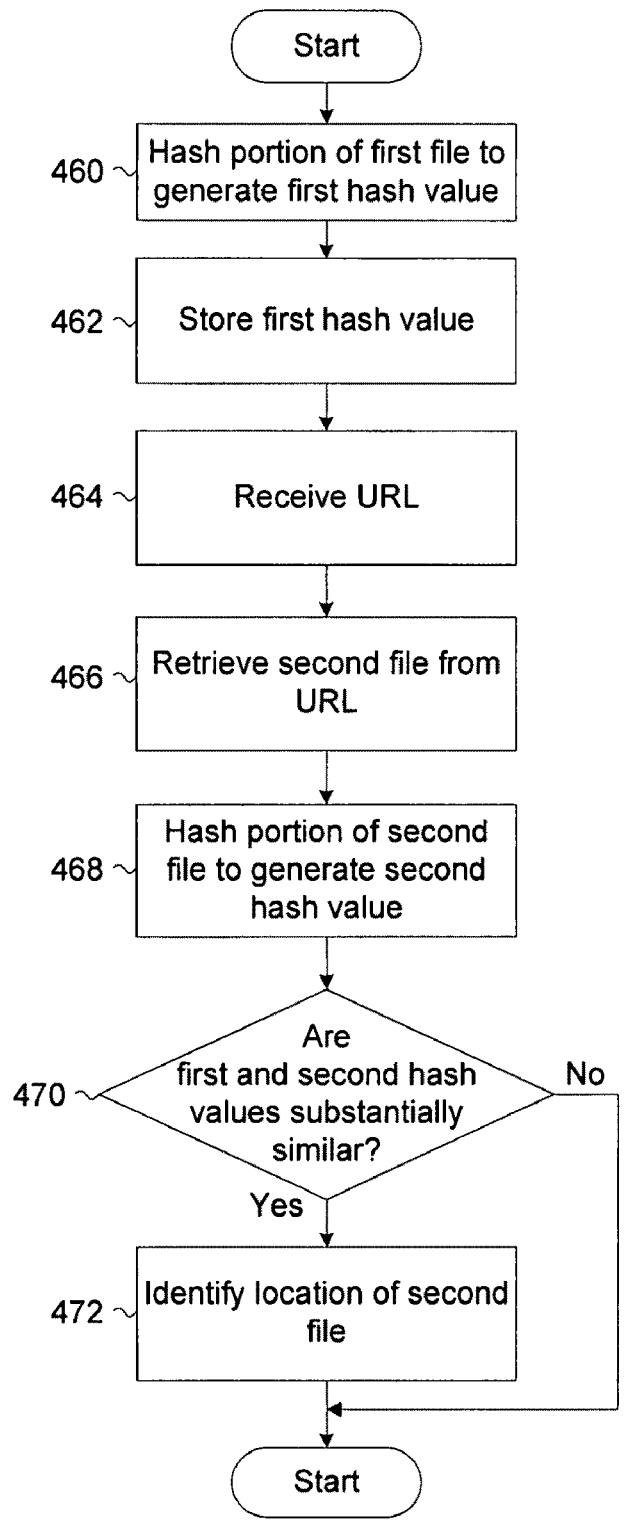
FIG. 4D illustrates an alternative exemplary overall process for surrogate hashing, in accordance with an embodiment.

FIG. 4D illustrates an alternative exemplary overall process for surrogate hashing, in accordance with an embodiment. Here, a first portion of a first file is hashed to generate (i.e., calculate) a first hash value (460). The hash value is stored (e.g., in storage 120 (FIG. 1)) (462). A URL is received and processed (464), from which a second file is retrieved (466). A second portion of the second file is hashed to generate (i.e., calculate) a second hash value (468). The first hash value and the second hash value are compared to determine whether they are substantially similar (470). In some embodiments, determining whether the first hash value and the second hash value are substantially similar may include determining whether the first hash value and the second hash value are the exact same value. In other embodiments, determining whether the first and the second hash value are substantially similar may include the first and second hash values being different, albeit slightly.

Figure 5:
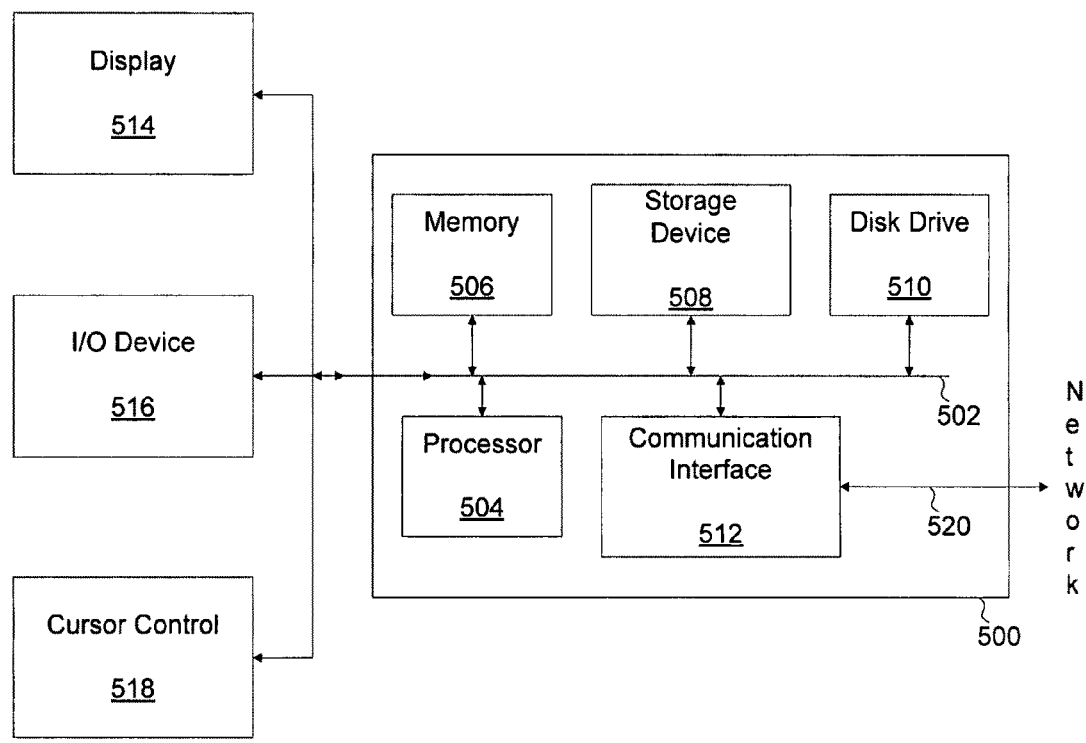
FIG. 5 illustrates an exemplary computer system suitable for surrogate hashing, in accordance with an embodiment.

FIG. 5 illustrates an exemplary computer system suitable for surrogate hashing, in accordance with an embodiment. In some examples, computer system 500 may be used to implement computer programs, applications, methods, processes, or other software to perform the above-described techniques. Computer system 500 includes a bus 502 or other communication mechanism for communicating information, which interconnects subsystems and devices, such as processor 504, system memory 506 (e.g., RAM), storage device 508 (e.g., ROM), disk drive 510 (e.g., magnetic or optical), communication interface 512 (e.g., modem or Ethernet card), display 514 (e.g., CRT or LCD), input device 516 (e.g., keyboard), and cursor control 518 (e.g., mouse or trackball).

According to some examples, computer system 500 performs specific operations by processor 504 executing one or more sequences of one or more instructions stored in system memory 506. Such instructions may be read into system memory 506 from another computer readable medium, such as static storage device 508 or disk drive 510. In some examples, hard-wired circuitry may be used in place of or in combination with software instructions for implementation.

The term "computer readable medium" refers to any medium that participates in providing instructions to processor 504 for execution. Such a medium may take many forms, including but not limited to, non-volatile media, volatile media, and transmission media. Non-volatile media includes, for example, optical or magnetic disks, such as disk drive 510.

Volatile media includes dynamic memory, such as system memory 506. Transmission media includes coaxial cables, copper wire, and fiber optics, including wires that comprise bus 502. Transmission media can also take other physical forms.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In some examples, execution of the sequences of instructions may be performed by a single computer system 500. According to some examples, two or more computer systems 500 coupled by communication link 520 (e.g., LAN, PSTN, or wireless network) may perform the sequence of instructions in coordination with one another. Computer system 500 may transmit and receive messages, data, and instructions, including program (i.e., application code) through communication link 520 and communication interface 512. Received program code may be executed by processor 504 as it is received, and/or stored in disk drive 510, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed is:

1. A method, comprising:
   retrieving a hostname, the hostname being evaluated to determine if an address is associated with the hostname;
   detecting the address, the address being further processed to download a first file identified by the address if the first file is associated with the hostname or storing the address if the address points to another hostname;
   identifying a standardized portion of the first file by identifying a data set to be selected consistently from the first file, wherein the data set is identified based on a size and a location associated with the first file;
   running a first hashing algorithm against the standardized portion of the first file to generate a first hash value;
   determining whether the first hash value is the same as or substantially similar to another hash value associated with a standardized portion of a second file;
   in response to determining that the first hash value is the same as or substantially similar to the hash value associated with the standardized portion of the second file, running a second hashing algorithm different from the first hashing algorithm against the standardized portion of the first file to generate a second hash value different from the first hash value; and
   storing the second hash value and the address associated with the first file.

2. The method of claim 1, further comprising retrieving the address if the address points to another hostname.

3. The method of claim 1, further comprising:
   retrieving the address if the address points to another hostname; and
   processing the address to download another file from the another hostname.

4. The method of claim 1, further comprising:
   retrieving the address if the address points to another hostname;
   processing the address to download another file from the another hostname;
   running a third hashing algorithm against another portion of the another file to generate a third hash value for the another file, and running a fourth hashing algorithm against the another portion of the another file to generate a fourth hash value for the another file;
   generating a fifth hash value for the another file by concatenating the third hash value of the another file with the fourth hash value of the another file; and
   storing the fifth hash value and the address associated with the another file.

5. The method of claim 1, further comprising registering a crawler with a storage facility.

6. The method of claim 1, further comprising evaluating the hostname to determine if another file should be downloaded.

7. The method of claim 1, further comprising evaluating the hostname to identify one or more other files, the one or more other files being downloaded.

8. The method of claim 7, wherein the one or more other files being downloaded are used to generate a plurality of hash values by running a third hashing algorithm against a first portion of each of the one or more other files to generate a third hash value for each of the one or more other files, running a fourth hashing algorithm against a second portion of each of the one or more other files to generate a fourth hash value for each of the one or more other files, and generating a fifth hash value for each of the one or more other files by concatenating the respective third hash value and the respective fourth hash value.

9. The method of claim 8, wherein the fifth hash value for each of the one or more other files are stored in a storage facility.

10. The method of claim 1, wherein storing the address further comprises storing the address with the second hash value.

11. The method of claim 1, further comprising comparing the address to a collection of one or more other addresses.

12. A method for file identification, comprising:
   evaluating an address associated with a hostname;
   comparing the address to the collection to determine if the address is stored in the collection;
   processing the address to download a first file identified by the address if the address is not stored in the collection or determining if another address is indicated by the address if the address is stored in the collection;
   identifying a standardized portion of the first file by identifying a data set to be selected consistently from the first file, wherein the data set is identified based on a size and a location associated with the first file;
   running a first hashing algorithm against the standardized portion of the first file to generate a first hash value;
   determining whether the first hash value is the same as or substantially similar to another hash value associated with a standardized portion of a second file; and
   in response to determining that the first hash value is the same as or substantially similar to the hash value associated with the standardized portion of the second file, running a second hashing algorithm different from the first hashing algorithm against the standardized portion of the first file to generate a second hash value different from the first hash value.

13. The method of claim 12, wherein processing the address further comprises storing the address if the address is associated with another hostname.

14. The method of claim 12, further comprising storing the address, the first hash value, and the second hash value.

15. A computer program product embodied in a non-transitory computer readable medium and comprising computer instructions for:
- retrieving a hostname, the hostname being evaluated to determine if an address is associated with the hostname;
- detecting the address, the address being further processed to download a first file identified by the address if the first file is associated with the hostname or storing the address if the address points to another hostname;
- identifying a standardized portion of the first file by identifying a data set to be selected consistently from the first file, wherein the data set is identified based on a size and a location associated with the first file;
- running a first hashing algorithm against the standardized portion of the first file to generate a first hash value
- determining whether the first hash value is the same as or substantially similar to another hash value associated with a standardized portion of a second file;
- in response to determining that the first hash value is the same as or substantially similar to the hash value associated with the standardized portion of the second file, running a second hashing algorithm different from the first hashing algorithm against the standardized portion of the first file to generate a second hash value different from the first hash value; and
- storing the address associated with the first file, the first hash value, and the second hash value.

16. The method of claim 1, further comprising determining whether the second hash value matches a stored hash value.

17. The method of claim 16, further comprising determining a location of another file that is associated with the stored hash value when the second hash value matches the stored hash value.

18. The method of claim 16, wherein determining whether the second hash value matches the stored hash value further comprises determining whether a portion of the second hash value matches the stored hash value, and the portion corresponds to the first hash value.

19. The method of claim 16, wherein the second hash value matches the stored hash value when the second hash value and the stored hash value are substantially similar.

20. A system, comprising:
- at least one processor and memory configured to:
- evaluate an address associated with a hostname;
- compare the address to the collection to determine if the address is stored in the collection;
- process the address to download a first file identified by the address if the address is not stored in the collection or determining if another address is indicated by the address if the address is stored in the collection;
- identify a standardized portion of the first file by identifying a data set to be selected consistently from the first file, wherein the data set is identified based on a size and a location associated with the first file;
- run a first hashing algorithm against the standardized portion of the first file to generate a first hash value
- determine whether the first hash value is the same as or substantially similar to another hash value associated with a standardized portion of a second file; and
- in response to determining that the first hash value is the same as or substantially similar to the hash value associated with the standardized portion of the second file, run a second hashing algorithm different from the first hashing algorithm against the standardized portion of the first file to generate a second hash value.

21. A system, comprising:
- a memory configured to be in data communication with a processor; and
- a processor configured:
- to retrieve a hostname, the hostname being evaluated to determine if an address is associated with the hostname;
- to detect the address, the address being further processed to download a first file identified by the address if the first file is associated with the hostname or storing the address if the address points to another hostname;
- to identify a standardized portion of the first file by identifying a data set to be selected consistently from the first file, wherein the data set is identified based on a size and a location associated with the first file;
- to run a first hashing algorithm against the standardized portion of the first file to generate a first hash value;
- to determine whether the first hash value is the same as or substantially similar to another hash value associated with a standardized portion of a second file;
- to run a second hashing algorithm different from the first hashing algorithm against the standardized portion of the first file to generate a second hash value different from the first hash value in response to determining that the first hash value is the same as or substantially similar to the hash value associated with the standardized portion of the second file; and
- to store the second hash value and the address associated with the first file.

22. The system of claim 21, further comprising a crawler instance registered with the memory.

23. The system of claim 21, wherein the memory is a database.

24. The system of claim 21, wherein the processor is further configured to process the address if the address points to another hostname and to download a file from the another hostname.

25. The system of claim 21, wherein the processor is further configured to process the address if the address points to another hostname, to download another file from the another hostname, to identify another standardized portion of data contents associated with the another file by identifying a data set to be selected consistently from the another file, wherein the data set is identified based on a size and a location associated with the another file, to run a third hashing algorithm against the another standardized portion of data contents to generate a third hash value for the another file, and to run a fourth hashing algorithm against the another standardized portion of data contents to generate a fourth hash value, to generate a fifth hash value for the another file by concatenating the third hash value of the another file and the fourth hash value of the another file, and to store the fifth hash value and the address associated with the another file.

26. The system of claim 21, wherein the processor is further configured to evaluate the hostname to determine if another file should be downloaded.

27. The system of claim 21, wherein the memory is further configured to store the address with the second hash value.

28. The system of claim 27, wherein the processor is further configured to compare the address to a collection of one or more other addresses.

29. The system of claim 21, wherein the processor is further configured to determine whether the second hash value matches a stored hash value.

30. The system of claim 29, wherein the processor is further configured to identify an address of another file that corresponds to the stored hash value when the second hash value matches the stored hash value.

31. A system, comprising:

a memory configured to store data associated with a hostname and an address, the memory configured to be in data communication with a processor; and a logic module configured:

to evaluate an address associated with a hostname, to compare the address to the collection to determine if the address is stored in the collection, to process the address to download a first file identified by the address if the address is not stored in the collection or determining if another address is indicated by the address if the address is stored in the collection, to identify a standardized portion of the first file by identifying a data set to be selected consistently from the first file, wherein the data set is identified based on a size and a location associated with the first file, to run a first hashing algorithm against the standardized portion of the first file to generate a first hash value, to determine whether the first hash value is the same as or substantially similar to another hash value associated with a standardized portion of a second file, and to run a second hashing algorithm different from the first hashing algorithm against the standardized portion of the first file to generate a second hash value different from the first hash value in response to determining that the first hash value is the same as or substantially similar to the hash value associated with the standardized portion of the second file.

32. The system of claim 31, wherein the logic module is further configured to download a file associated with the address.

33. The system of claim 31, wherein the logic module is further configured to store the address if the address is not associated with the hostname.

34. The system of claim 31, wherein the memory is further configured to store the address and the second hash value.

35. The system of claim 31, wherein the logic module is further configured to determine whether the second hash value matches a stored hash value.

36. The system of claim 35, wherein the logic module is further configured to identify an address of another file that corresponds to the stored hash value when the second hash value matches the stored hash value.

37. A system, comprising:

one or more databases configured to store data associated with one or more addresses;

a crawler instance configured to crawl the one or more addresses, wherein the crawler is registered with one or more databases; and a distributed processor network configured:

to evaluate an address associated with a hostname, to compare the address to another address stored in a collection, to process the address to download a first file identified by the address if the address is not stored in the collection, to identify a standardized portion of the first file by identifying a data set to be selected consistently from the first file, wherein the data is identified based on a size and a location associated with the first file, to run a first hashing algorithm against the standardized portion of the first file to generate a first hash value, to determine whether the first hash value is the same as or substantially similar to another hash value associated with a standardized portion of a second file, and to run a second hashing algorithm different from the first hashing algorithm against the standardized portion of the first file to generate a second hash value different from the first hash value in response to determining that the first hash value is the same as or substantially similar to the hash value associated with the standardized portion of the second file.

38. The system of claim 37, wherein the distributed processor network is further configured to determine whether the second hash value matches a stored hash value.

39. The system of claim 38, wherein the distributed processor network is further configured to identify an address of another file that corresponds to the stored hash value when the second hash value matches the stored hash value.

* * * * *